Figure 1:
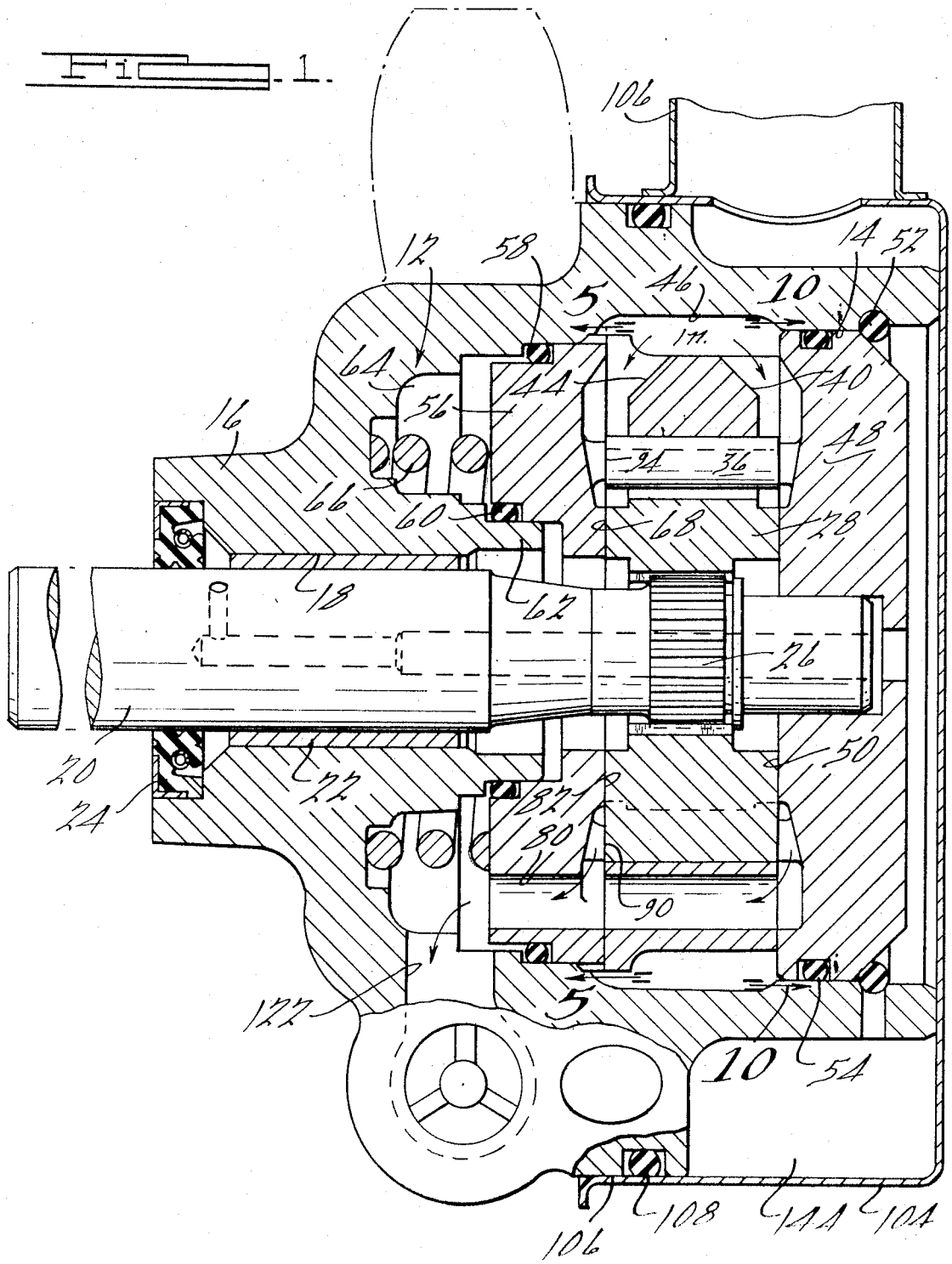
Figure 2:
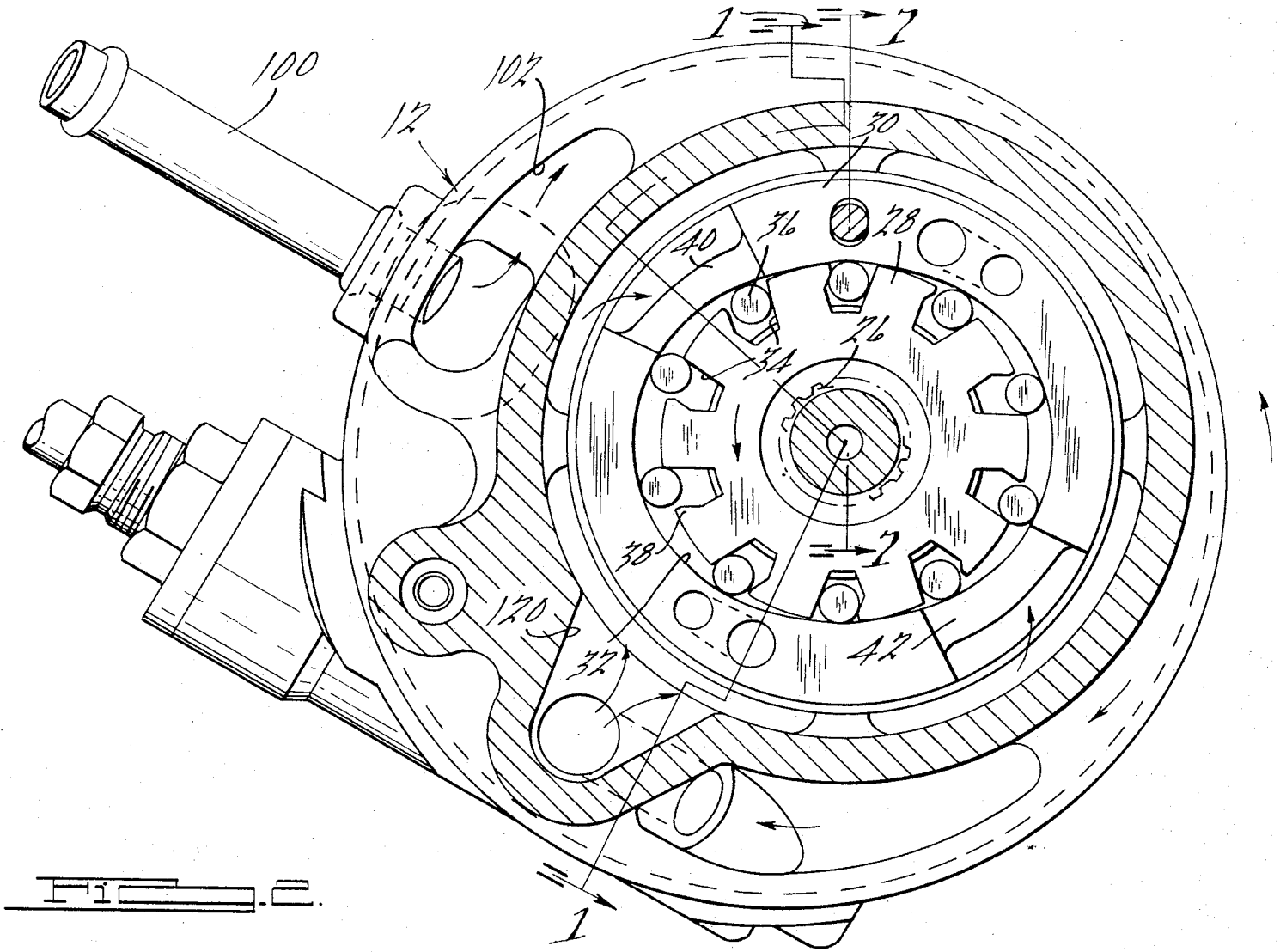
Figure 3:
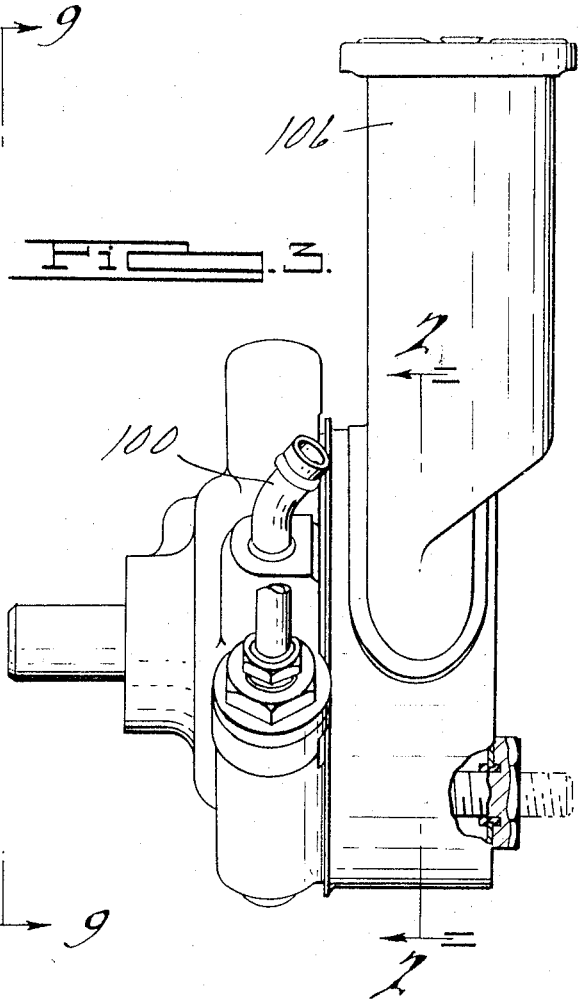
Figure 4:
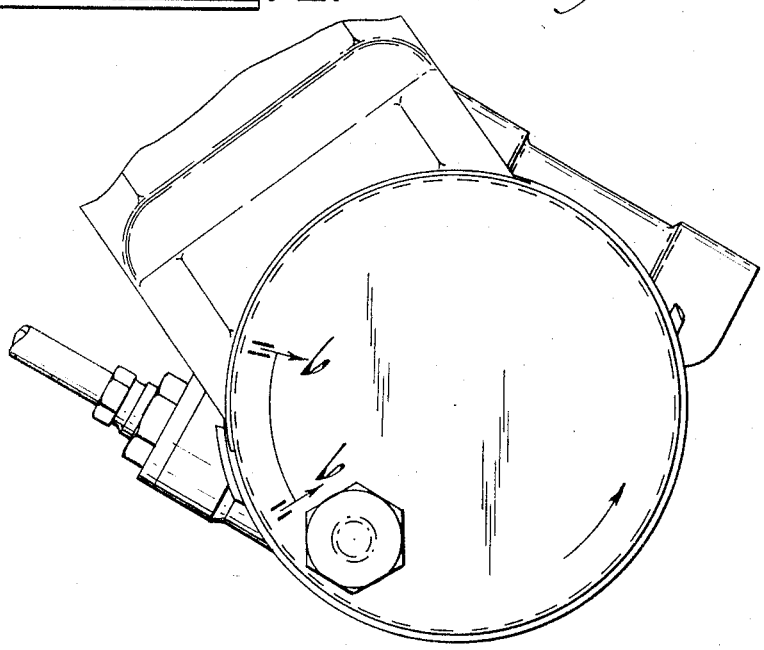
Figure 5:
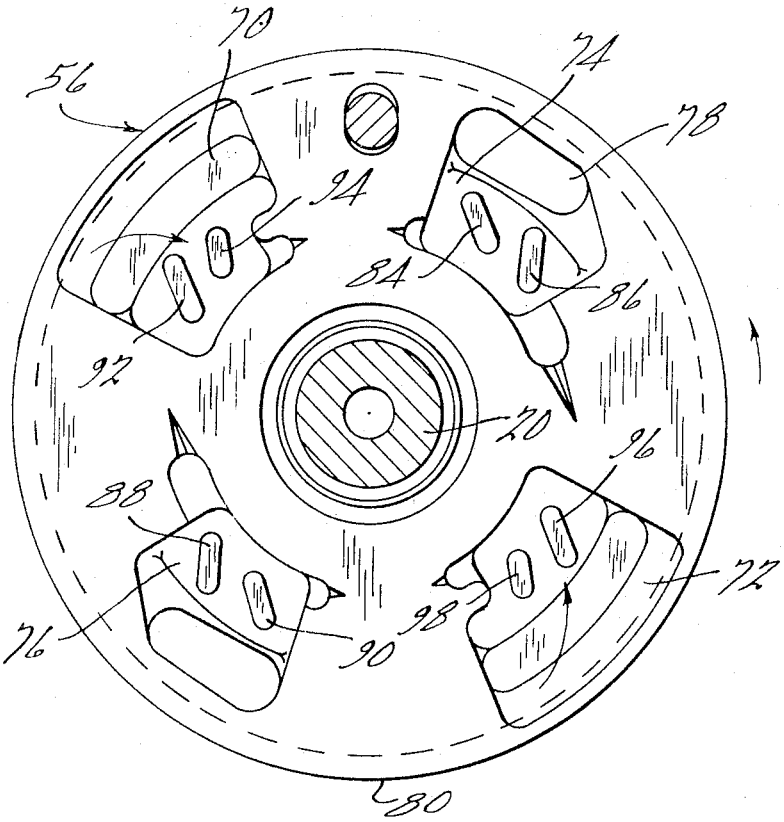
Figure 6:
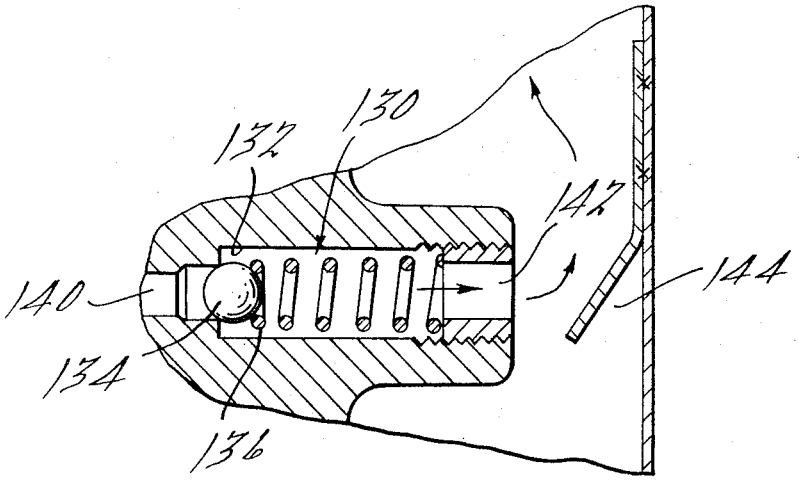
Figure 7:
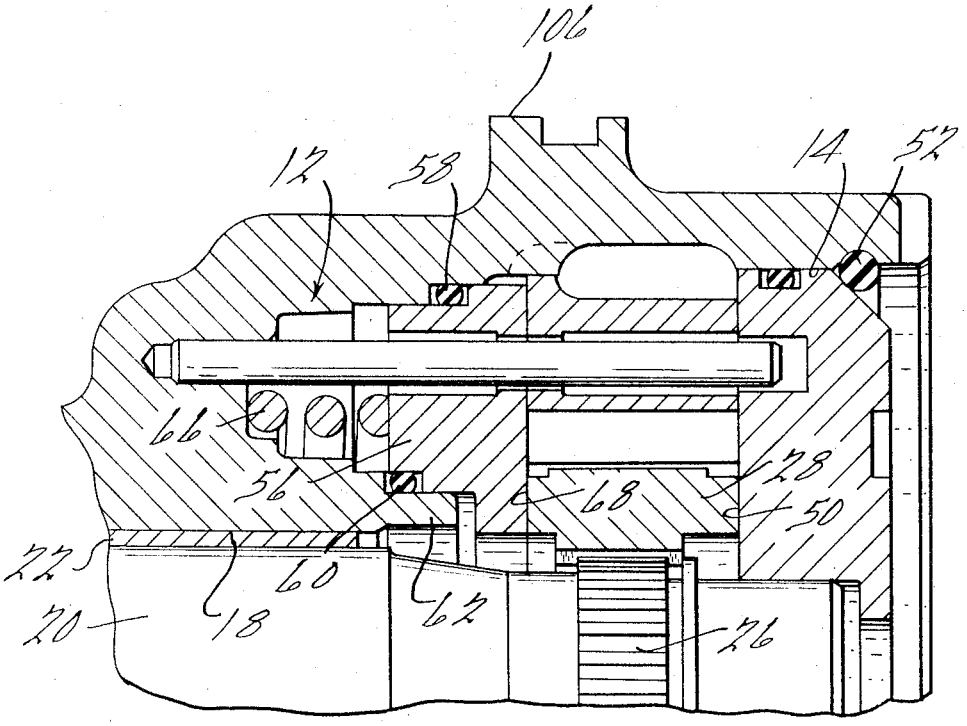
Figure 8:
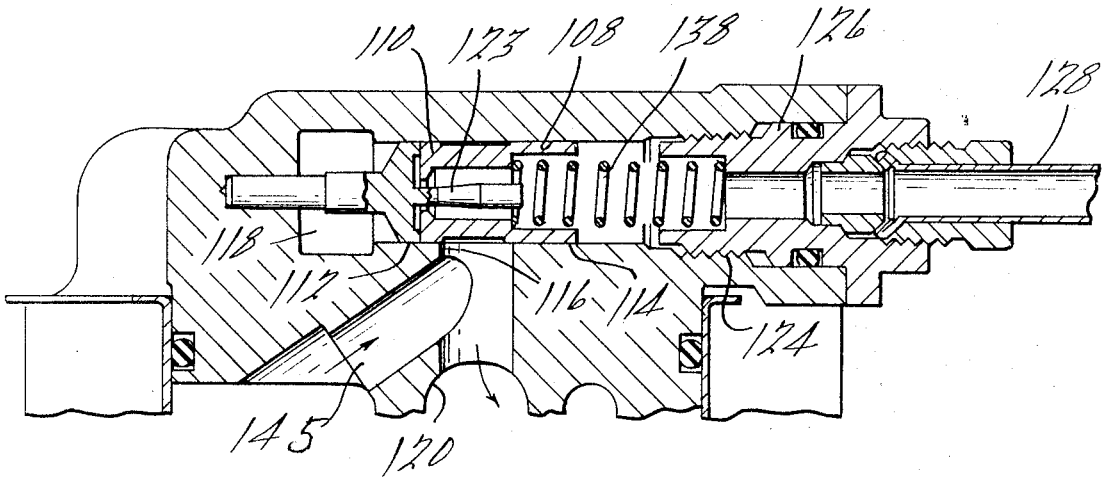
Figure 9:
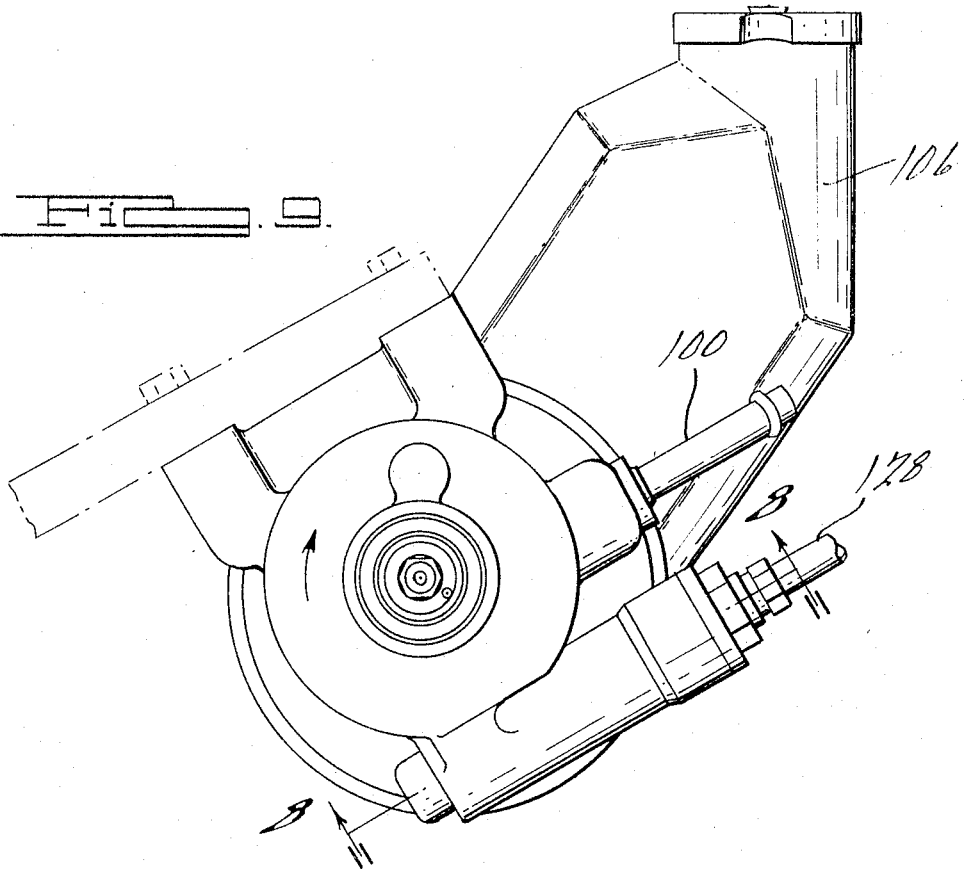
Figure 10:
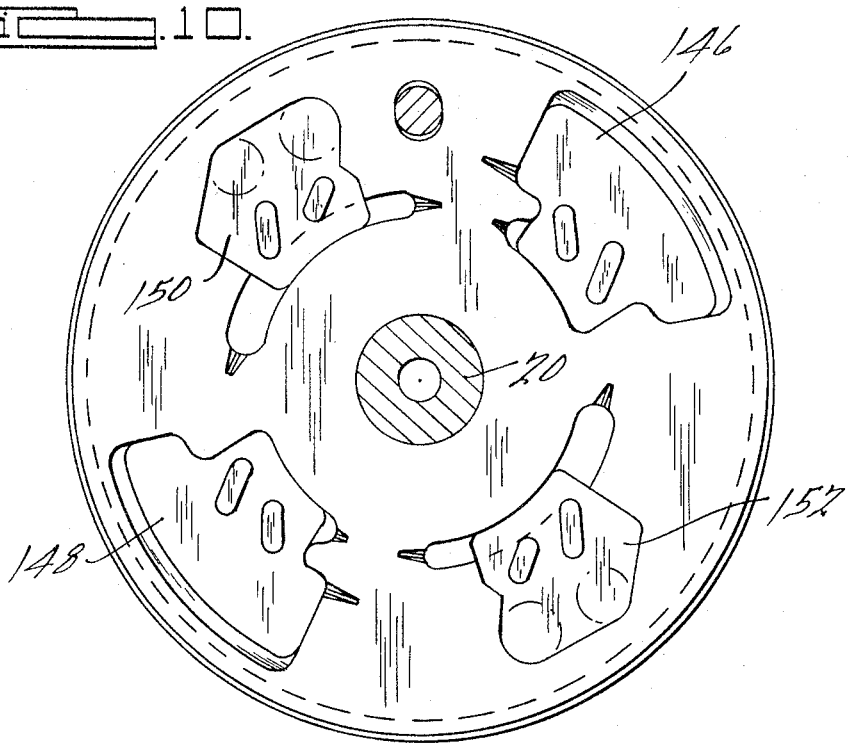

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 9

T927,009

COMPACT POSITIVE DISPLACEMENT PUMP

Glenn A. Ulrich, Birmingham, Mich., assignor to Ford Motor Company, Dearborn, Mich.

Continuation of application Ser. No. 187,104, Oct. 8, 1971. This application Oct. 23, 1973, Ser. No. 408,713

Int. Cl. F01c *19/10*

U.S. Cl. 418—133

6 Sheets Drawing. 12 Pages Specification

A positive displacement pump adapted especially for use in power steering systems for automotive vehicles comprising a pump housing, a pump cam and rotor assembly received within the housing, ported pressure plates situated on opposed sides of the cam and rotor assembly, the outermost pressure plate being secured fast to the housing and the innermost pressure plate being urged into sealing engagement with the cam and rotor assembly and cooperating with the housing to define a high pressure region which communicates with a pressure-relief and flow-control valve assembly in the housing and a reservoir surrounding the housing and communicating

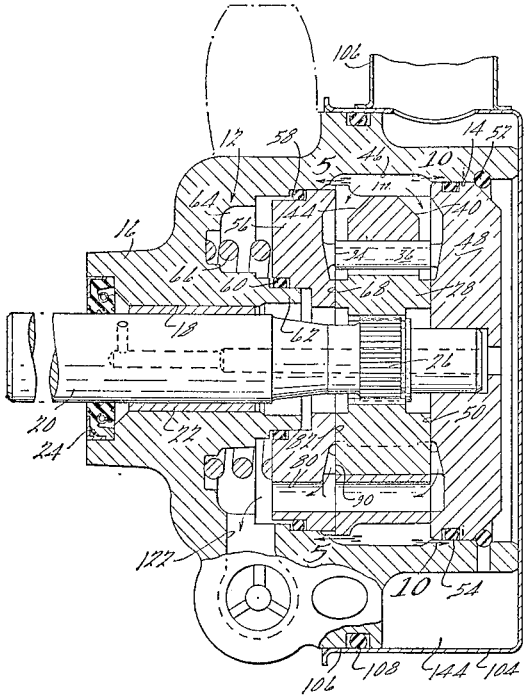

with the inlet side of the flow-control portions of the valve assembly and the outlet side of the pressure-relief portions.

Oct. 1, 1974 G. A. ULRICH T927,009

COMPACT POSITIVE DISPLACEMENT PUMP

Original Filed Oct. 8 1971 6 Sheets-Sheet 1

COMPACT POSITIVE DISPLACEMENT PUMP

Original Filed Oct. 8, 1971 6 Sheets-Sheet 2

COMPACT POSITIVE DISPLACEMENT PUMP

Original Filed Oct. 8, 1971 6 Sheets-Sheet 5

COMPACT POSITIVE DISPLACEMENT PUMP

Original Filed Oct. 8, 1971 6 Sheets-Sheet 4

COMPACT POSITIVE DISPLACEMENT PUMP

Original Filed Oct. 8, 1971 6 Sheets-Sheet 5

COMPACT POSITIVE DISPLACEMENT PUMP

Original Filed Oct. 8, 1971 6 Sheets-Sheet 6